United States Patent
Parkhe et al.

(10) Patent No.: US 6,535,372 B2
(45) Date of Patent: Mar. 18, 2003

(54) CONTROLLED RESISTIVITY BORON NITRIDE ELECTROSTATIC CHUCK APPARATUS FOR RETAINING A SEMICONDUCTOR WAFER AND METHOD OF FABRICATING THE SAME

(75) Inventors: Vijay D. Parkhe, San Jose, CA (US); Chandra V. Deshpandey, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/885,646

(22) Filed: Jun. 20, 2001

(65) Prior Publication Data

US 2002/0196596 A1 Dec. 26, 2002

(51) Int. Cl.$^7$ ............................................. H01T 23/00
(52) U.S. Cl. ......................................... 361/234; 279/128
(58) Field of Search ........................... 29/825; 279/128; 361/234, 230, 231, 232, 233, 235

(56) References Cited

U.S. PATENT DOCUMENTS

| | | | |
|---|---|---|---|
| 5,228,501 A | 7/1993 | Tepman et al. | 165/80.1 |
| 5,350,479 A | 9/1994 | Collins et al. | 156/345 |
| 5,463,526 A | 10/1995 | Mundt | 361/234 |
| 5,606,484 A * | 2/1997 | Kawada et al. | 279/128 |
| 5,748,436 A | 5/1998 | Honma et al. | 361/234 |
| 6,134,096 A | 10/2000 | Yamada, et al. | 361/234 |
| 6,296,780 B1 * | 10/2001 | Yan et al. | 216/67 |

* cited by examiner

Primary Examiner—Shawn Riley
(74) Attorney, Agent, or Firm—Moser, Patterson & Sheridan, LLP

(57) ABSTRACT

Apparatus for retaining a workpiece in a semiconductor processing chamber and method for fabricating the same. In one embodiment, a method for fabricating the apparatus includes providing a controlled resistivity boron nitride (CRBN) plate. A conductive layer is disposed on a portion of a lower surface of the CRBN plate to form at least one chucking electrode. A layer of boron nitride powder is disposed on the conductive layer and the lower surface of the CRBN plate. The CRBN plate, the conductive layer, and the boron nitride powder are hot pressed together to form the apparatus. In a second embodiment, a conductive electrode layer is deposited on a portion of a lower surface of the CRBN plate. A layer of pyrolytic boron nitride is deposited on the conductive layer and the lower surface of the CRBN plate to form the apparatus.

18 Claims, 8 Drawing Sheets

CONTROLLED RESISTIVITY BORON NITRIDE ELECTROSTATIC CHUCK APPARATUS FOR RETAINING A SEMICONDUCTOR WAFER AND METHOD OF FABRICATING THE SAME

BACKGROUND OF THE INVENTION

1. Field of the Invention

The invention relates generally to an apparatus for retaining a workpiece within a semiconductor wafer processing system and, more specifically, to an improved composition of a electrostatic chuck that maximizes electrostatic clamping ability without loss of material strength or modulus of elasticity.

2. Description of the Background Art

Electrostatic chucks are used for retaining a workpiece in various applications including retaining a semiconductor wafer within a semiconductor wafer process chamber. Although electrostatic chucks vary in design, they all are based on the principle of applying a voltage to one or more electrodes in the chuck so as to induce opposite polarity charges in the workpiece and electrodes, respectively. The electrostatic attractive force between the opposite charges presses the workpiece against the chuck, thereby retaining the workpiece.

In semiconductor wafer processing equipment, electrostatic chucks are used for clamping wafers to a pedestal during processing. The pedestal may form an electrode and a heat sink or heater as used in etching, physical vapor deposition (PVD) or chemical vapor deposition (CVD) applications. For a detailed understanding of the reaction chamber and its operation in processing the wafer, the reader should refer to the drawings and the detailed description contained in U.S. Pat. No. 5,228,501, issued to Tepman et al. on Jul. 20, 1993, and incorporated herein by reference. That patent teaches a PVD wafer-processing chamber manufactured by Applied Materials, Inc. of Santa Clara, Calif. Additionally, the operation of a conventional electrostatic chuck is disclosed in U.S. Pat. No. 5,350,479, issued to Collins et al. on Sep. 27, 1994 assigned to the assignee hereof, and its disclosure is incorporated herein by reference.

The mechanism of attraction in the electrostatic chuck used in these types of wafer processing systems is generally a Coulombic force. That is, the increase of charges in an insulated electrode induces opposite charges to gather on the backside of the wafer. The resultant force is generally weak per unit area i.e., 15 g/cm$^2$ at 1500V DC because of the composition of the chuck. For example, a commonly used type of dielectric material for fabricating electrostatic chucks is polyimide. Specifically, electrodes are usually sandwiched between two sheets of polyimide to form an electrostatic chuck. Among the beneficial characteristics of polyimide are its high strength and high modulus of elasticity. This material also has high volume resistivity (on the order of 10$^{15}$ ohm-cm) and surface resistivity (on the order of 10$^{14}$ ohm/cm$^2$). Since the electrode(s) are insulated and a high resistivity dielectric is used, the charges creating the chucking force are not mobile i.e., the dielectric layer separates the electrode and wafer. As such, the wafer must come into contact with a large area of the chuck so that an adequate charge accumulation is established for wafer retention.

One example of an improved electrostatic chuck is one that employs the Johnsen-Rahbek (J-R) effect and can be found in U.S. Pat. No. 5,463,526, issued Oct. 31, 1995 to Mundt. In such a chuck, the dielectric material has an intermediate resistivity instead of a high resistivity. As such, there are mobile charges present in the dielectric material. These mobile charges create a small but effective current flow between the backside of the wafer and Electrostatic chucks using the J-R effect are usually fabricated from a ceramic having an intermediate or "leaky" dielectric characteristic. Materials such as aluminum nitride, and silicon oxides the top surface of the electrostatic chuck.

Oxides and nitrides are popular and well known for use in electrostatic chucks. However, these types of materials, and specifically aluminum nitride, become increasingly conductive after prolonged processing exposure at high temperatures such as 500° to 600° Celsius. As such, more mobile charges are able to pass through the chuck material and into the wafer, thereby lessening the accumulation of the mobile charges within the top surface of the electrostatic chuck and the backside of the wafer. As a result, the electrostatic force across the chuck surface is weakened, thereby reducing the chucking capabilities of the electrostatic chuck. Furthermore, in extreme cases, the wafer may become damaged due to the excessive current flow through the chuck and wafer.

Therefore, there is a need in the art for an improved apparatus for retaining a wafer, but have a reduced resistivity level so as to take advantage of the J-R effect for clamping the wafer. Additionally, such an apparatus should be simple and cost-effective in design and construction to properly retain the wafer or workpiece. Moreover, such an apparatus must be able to withstand repeated processing cycles without deteriorating, that is, exhibiting excessive conducting current through the surface of the electrostatic chuck at the expense of weakening chucking forces.

SUMMARY OF THE INVENTION

The disadvantages heretofore associated with the prior art are overcome by an apparatus for retaining a workpiece in a semiconductor processing chamber. The apparatus includes a controlled resistivity boron nitride plate and at least one chucking electrode embedded in the controlled resistivity boron nitride plate. Optionally, a heater plate, fabricated from boron nitride and having at least one heater element embedded therein, is disposed beneath the controlled resistivity boron nitride plate to provide temperature regulation of the apparatus during semiconductor processing.

A first method for fabricating the apparatus includes providing the controlled resistivity boron nitride plate. A conductive layer is disposed on a portion of a lower surface of the controlled resistivity boron nitride plate to form the at least one chucking electrode. A layer of boron nitride powder is disposed on the conductive layer and the lower surface of the controlled resistivity boron nitride plate. Thereafter, the controlled resistivity boron nitride plate, conductive layer, and boron nitride powder are hot pressed together to form the apparatus.

A second method for fabricating the apparatus includes providing a controlled resistivity boron nitride plate. At least one conductive layer is deposited on a portion a lower surface of the controlled resistivity boron nitride plate to form the at least one chucking electrode. A layer of pyrolytic boron nitride is deposited on the conductive layer and the lower surface of the controlled resistivity boron nitride plate to form the apparatus.

BRIEF DESCRIPTION OF THE FIGURES

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
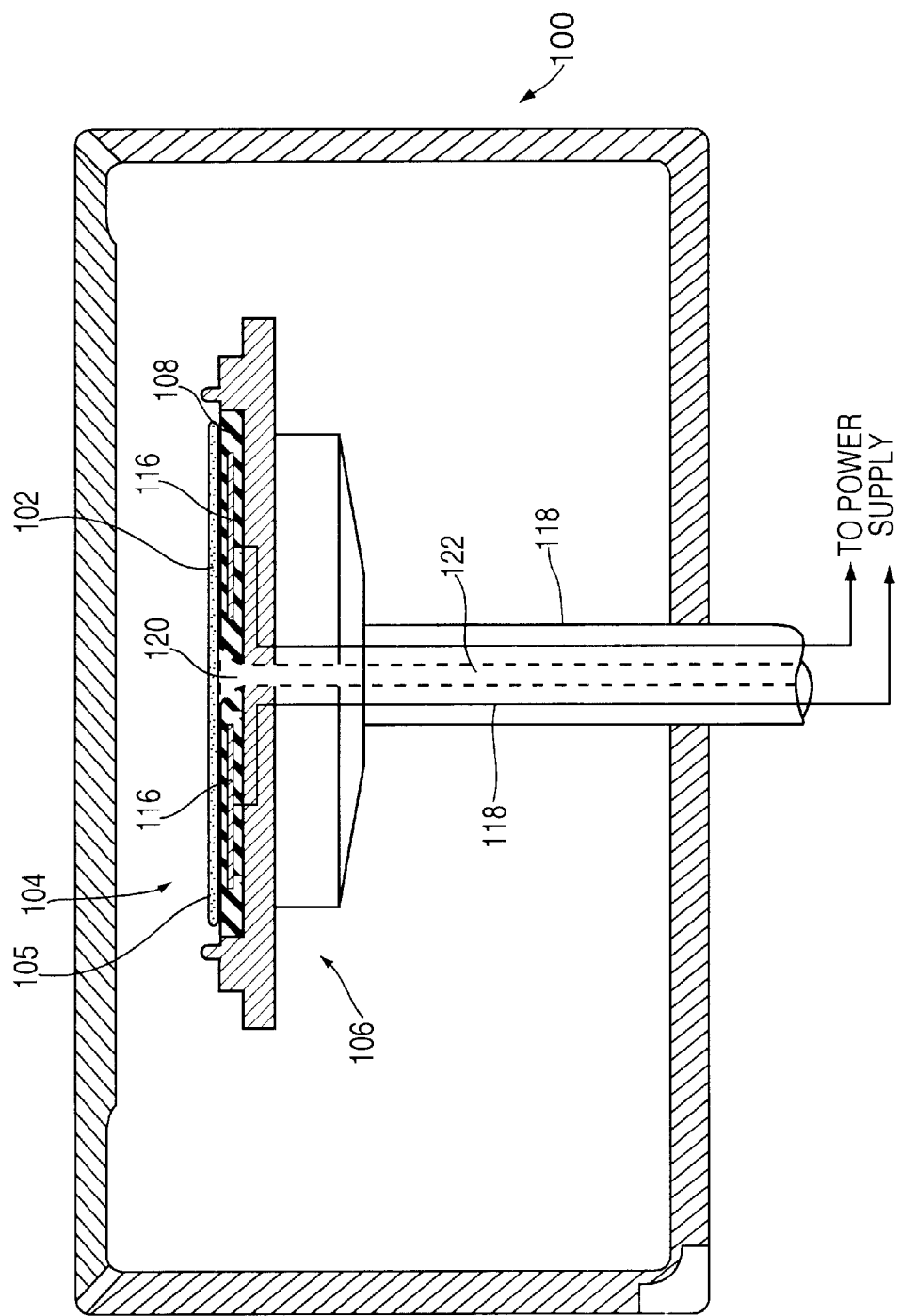
FIG. 1 is a cross-sectional view of a wafer-processing chamber of the present invention.

FIG. 1 depicts a cross-sectional view of a wafer-processing chamber 100 of the present invention. The wafer-processing chamber 100 is used for processing semiconductor wafers, for example, during a reflow process operated at a temperature of approximately 550° C. The chamber 100 includes a pedestal 106 supporting an electrostatic chuck 104. The electrostatic chuck 104 has at least one electrode 116, which is surrounded by an insulating material 108. A wafer 102 to be processed is and placed upon an upper surface 105 of the electrostatic chuck 104. Specifically, the at least one electrode 116 is either embedded within the body of the electrostatic chuck 104 or encased in the insulative material 108 (e.g., layers of boron nitride), which comprise the electrostatic chuck 104. The at least one electrode 116 is coupled to a power supply (not shown) via electrical conductors 118. A voltage from the power supply creates the electrostatic (or clamping) force that draws the wafer 102 to the chuck 104. Furthermore, an optional backside gas conduit 122 (shown in phantom), extending through the pedestal 106 and electrostatic chuck 104 to a center aperture 120 provided in the chuck 104, may be used to provide a backside gas from a gas source (not shown). The backside gas is utilized to distribute heat uniformly across the entire backside of the wafer 102 (see FIG. 6 for further details regarding this optional embodiment).

Figure 2:
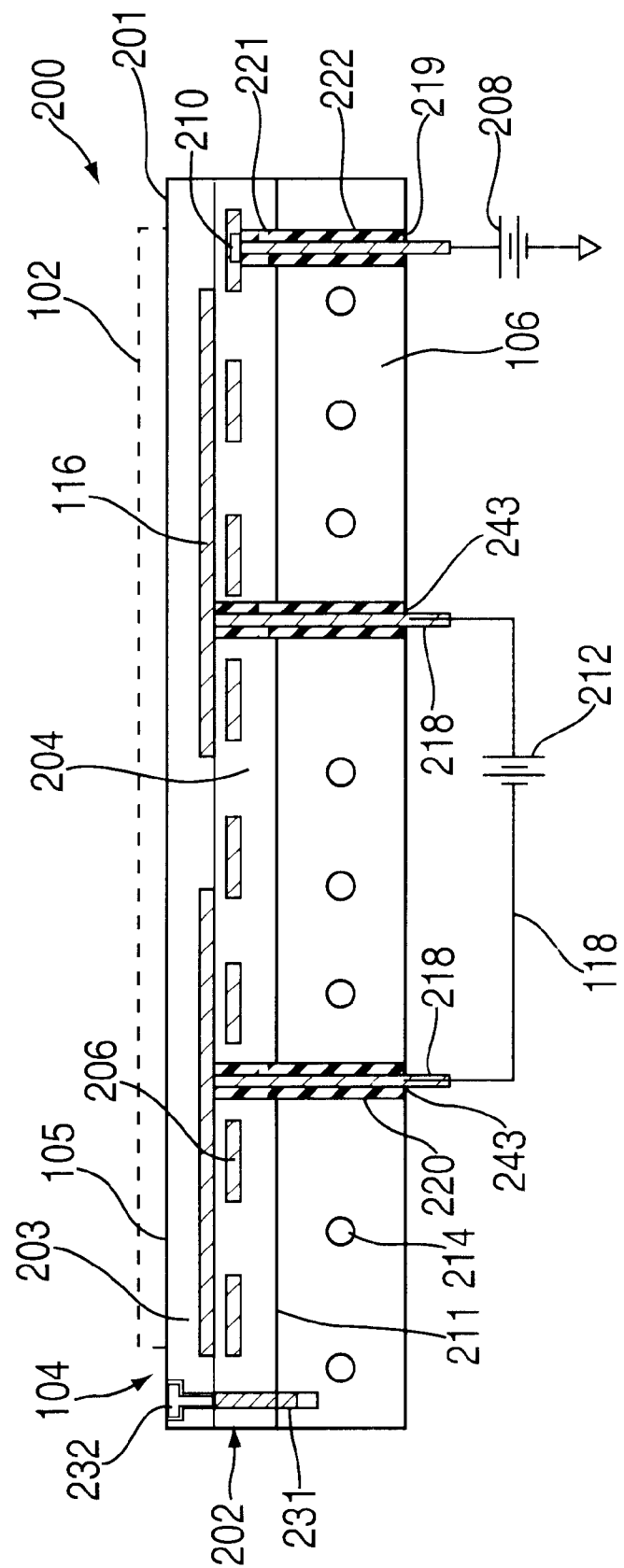
FIG. 2 is a cross-sectional view of a substrate support assembly of the present invention.

FIG. 2 depicts a detailed, cross-sectional view of an inventive semiconductor wafer support assembly 200. Generally, the semiconductor wafer support assembly 200 comprises an electrostatic chuck 104 integrated with a heater plate 204 to form a temperature controlled electrostatic chuck assembly 202. For purposes of the inventive apparatus, the heater plate 204 is discussed as part of the electrostatic chuck assembly 202. However, the heater plate 204 is optionally formed with the electrostatic chuck 104 and does not detract from the inventive electrostatic chuck 104. Thus, the heater plate 204 is optionally utilized in instances where temperature control of the electrostatic chuck 104 is required during processing. As such, in another embodiment (not shown), the heater element may alternately be positioned in the electrostatic chuck 104, below the chucking electrode 116.

The heater plate 204 and electrostatic chuck 104 have substantially equal diameters and are capable of supporting, for example, a 200-millimeter diameter semiconductor wafer. The dimensions specified for the chuck assembly 202 and wafer 102 that can be supported thereon are to be understood as non-limiting examples to those skilled in the art. That is, a chuck assembly 202 for supporting a 300-mm diameter wafer can also be fabricated in accordance with the subject invention. In addition, the diameter of the chuck assembly 202 is typically greater than the diameter of the wafer. For example, an approximately 9-inch chuck assembly 202 is utilized during the reflow process to support the 200 mm wafer (approximately 8 inches). The combination of the chuck assembly 202 (electrostatic chuck/heater plate 104/204) is detachably mounted to the pedestal 106 as will be discussed in further detail below.

The pedestal 106 is preferably fabricated from stainless steel, or a durable material (i.e., a metallic substance) such as an alloy of aluminum or copper. Alternately the pedestal 106 may be fabricated from a ceramic such as aluminum nitride, silicon nitride, silicon dioxide, and the like. Furthermore, the pedestal 106 comprises a plurality of channels 214 that are arranged in a pattern to provide a coolant uniformly therethrough. The pattern illustratively may be a coil shape that extends radially from approximately the center to approximately the outer edge of the pedestal, however, one skilled in the art will recognize that other configurations may be utilized. In this manner, the coolant, such as water may uniformly flow through the pedestal 106 to transfer undesirable heat from the electrostatic chuck assembly 202.

The electrostatic chuck 104 is fabricated from a semiconductor material, specifically, boron nitride (BN) having a controlled resistivity. The boron nitride material is either hot pressed or issostatically hot pressed to produce a plate 202 having the controlled resistivity of approximately $10^{11}$ ohm-cm, without having to add a dopant material such as carbon or the like. Such controlled resistivity boron nitride plate 104 is commercially available in hot press form from Advanced Ceramics Corporation. of Cleveland, Ohio, USA, or could be produced by hot issostatically pressed BN powder. By utilizing the controlled resistivity boron nitride (CRBN) chuck, the principle mechanism of attraction in the chuck changes from the weak Coulombic forces to the highly desirable Johnson-Rahbek effect. Moreover, the CRBN chuck is capable of operating at processing temperatures in a range of 25° C. to 800° C.

In addition, the optional heater plate 204 is also fabricated from the ceramic material boron nitride. However, the heater plate does not require a controlled resistivity value and therefore, does not undergo prefabrication issostatic hot pressing. In one particular embodiment, a boron nitride plate having a high resistivity value of approximately $10^{15}$ ohm-cm is used to fabricate the heater plate 204. Furthermore, by utilizing boron nitride as a fabrication material for both the electrostatic chuck 104 and the heater plate 204, the thermal expansion coefficients of the two components are approximately the same. As such, when hot pressing the electrostatic chuck 104 to the heater plate 204, a temperature gradient is avoided therebetween, thereby reducing the susceptibility to distortion, thermal cracking, or damaging the plates 202 and 204 or internal components during the assembly process.

In order to provide uniform temperature control of the electrostatic chuck 104 for a high temperature operating range of 500° C. to 650° C., the optional heater plate 204 comprises one or more heater elements 206. The heater element 206 may be fabricated from materials such as molybdenum, tungsten, tantalum, graphite, or any other high temperature metal capable of conducting current and transferring heat. In a preferred embodiment, a single heater element 206 fabricated from graphite extends radially outward in the heater plate 204 in a coil like manner. However, a person skilled in the art will recognize that the heater element 206 may be in a zoned heating configuration, may be a plurality of heater elements radiating concentrically, or in any other pattern that will uniformly transfer heat from the heater plate 204 to the electrostatic chuck 104.

In particular, the heater element 206 is coupled to the power supply 208 via a feedthrough 210 (e.g., a bolt) extending through the chuck 104, heater plate 204, and pedestal 106. Specifically, a bore 219 traverses through the chuck 104, heater plate 204, and pedestal 106. The illustrative bolt 210 is inserted into the bore 219 such that the bolt, (i.e., the bolt head) is in contact with the heater element 206 in the heater plate 204. A first portion of the bore 219 disposed over the feedthrough 210 is then filled with a ceramic material 221 such as a controlled resistivity boron nitride powder. Furthermore, a second portion of the bore 219 extending through the pedestal 106 is insulated with an insulating sleeve 222 such as alumina ($Al_2O_3$). Alternately, the feedthrough 210 may extend from the upper surface 201 of the electrostatic chuck 104 about the peripheral edge, which is in an area radially extending beyond the diameter of the wafer 102. The power supply 208 is then coupled to the bolt 219 to provide current to the heater element 206, which subsequently radiates heat therefrom. As such, the heater element 206 generates heat, which is thermally conducted through the heater plate 204 and the entire surface area of the electrostatic chuck 104 to maintain the wafer 102 at desired processing temperatures. Additionally, the heater plate 204 is used to bake out any undesired moisture accumulating on the semiconductor wafer support assembly 200 during processing.

Continuing with FIG. 2, disposed between electrostatic chuck 104 and the heater plate 204 is the at least one electrode 116. FIG. 2 depicts a bipolar electrode configuration, which contains a pair of coplanar electrodes 116. The at least one electrode 116 may be fabricated from a conductive material such as tungsten, molybdenum, tantalum, and the like. In the preferred embodiment, the electrodes 116 are fabricated from graphite, which are approximately 50–300 microns thick, and may be in any shape required to maximize chucking force applied to the wafer 102. For example, bipolar electrodes 116 may be in the form of two half-moons, concentric circles, a plurality of individual pads electrically connected by an interconnection trace, or the like. Alternately, a monopolar electrode such as an electrode plate having a thickness of approximately 100 microns may be utilized in place of the bipolar electrodes 116 disclosed in FIG. 2. In either of the alternate embodiments, the electrode 116 extends in diameter less than the diameter of the chuck assembly 202.

The electrodes 116 are connected to a power source 212 via electrical conductors 118 coupled to electrical feedthroughs 218. Specifically, each chucking electrode 116 (or electrode plate) is coupled to the power source 212 via feedthrough 218. In particular, a pair of bores 243 traverse through the pedestal 106 and heater plate 204. The pair of feedthroughs 218 are respectively inserted into the pair of bores 243 and surrounded by an insulating sleeve 220 such as alumina ($Al_2O_3$). One skilled in the art will recognize that for a monopolar electrode, a single bore 243 for housing a feedthrough 218 is utilized. For a detailed understanding of an RF electrode contact assembly for a detachable electrostatic chuck, the reader should refer to the drawings and the detailed description contained in commonly assigned pending U.S. application Ser. No. 09/126,895, filed Jul. 31, 1998, and incorporated herein by reference. That disclosure discloses a detachable electrostatic chuck used in a physical vapor deposition, chemical vapor deposition, or etching chamber manufactured by Applied Materials, Inc. of Santa Clara, Calif.

In this manner, the power source 212 provides the necessary voltage to the electrodes 116 to clamp the wafer 102 to the chuck assembly 202. The electrodes 116 may be connected to the power source 212 in any configuration necessary to form the required chucking force. For example, FIG. 2 depicts a bipolar configuration, but this does not preclude the use of other types of configurations including a monopolar configuration.

The chuck assembly 202 (i.e., electrostatic chuck/heater plates 203/204) is attached to the top surface 211 of the pedestal 106. In one embodiment, attachment is accommodated by bolting a plurality of bolts 232 (only one bolt shown) through a corresponding threaded hole 231, which extends through the electrostatic chuck/heater plate 203/204 and the pedestal 106. In a second embodiment, heater plate 204 is high temperature brazed or electron beam welded to the pedestal 106.

Alternately, the chuck assembly 202 may be detachably coupled by clamping the periphery of the electrostatic chuck/heater plate 203/204 to the top surface 211 of the pedestal 106. Such a detachable electrostatic chuck assembly 202 facilitates ease in maintaining the semiconductor wafer support assembly 200 and processing chamber 100. For a detailed understanding of a clamped detachable electrostatic chuck and its operation in processing the wafer, the reader should refer to the drawings and the detailed description contained in U.S. Pat. No. 6,034,863, issued Mar. 7, 2000, and commonly assigned to Applied Materials, Inc. of Santa Clara, Calif. That application teaches a processing chamber such as a PVD chamber having a detachable electrostatic chuck and heater plate clamped to a pedestal and is incorporated herein by reference.

Various methods for fabricating the controlled resistivity boron nitride electrostatic chuck 104 and heater plate 204 may be utilized. These methods include hot pressing or hot issostatically pressing boron nitride plates and conductive layers together, deposition processes via, preferably, a chemical vapor deposition process (CVD), or a combination of hot pressing (or hot issostatically pressing) and CVD. Furthermore, one skilled in the art will recognize that other deposition processes, such as physical vapor deposition (PVD), and the like may also be utilized.

Figure 3A:
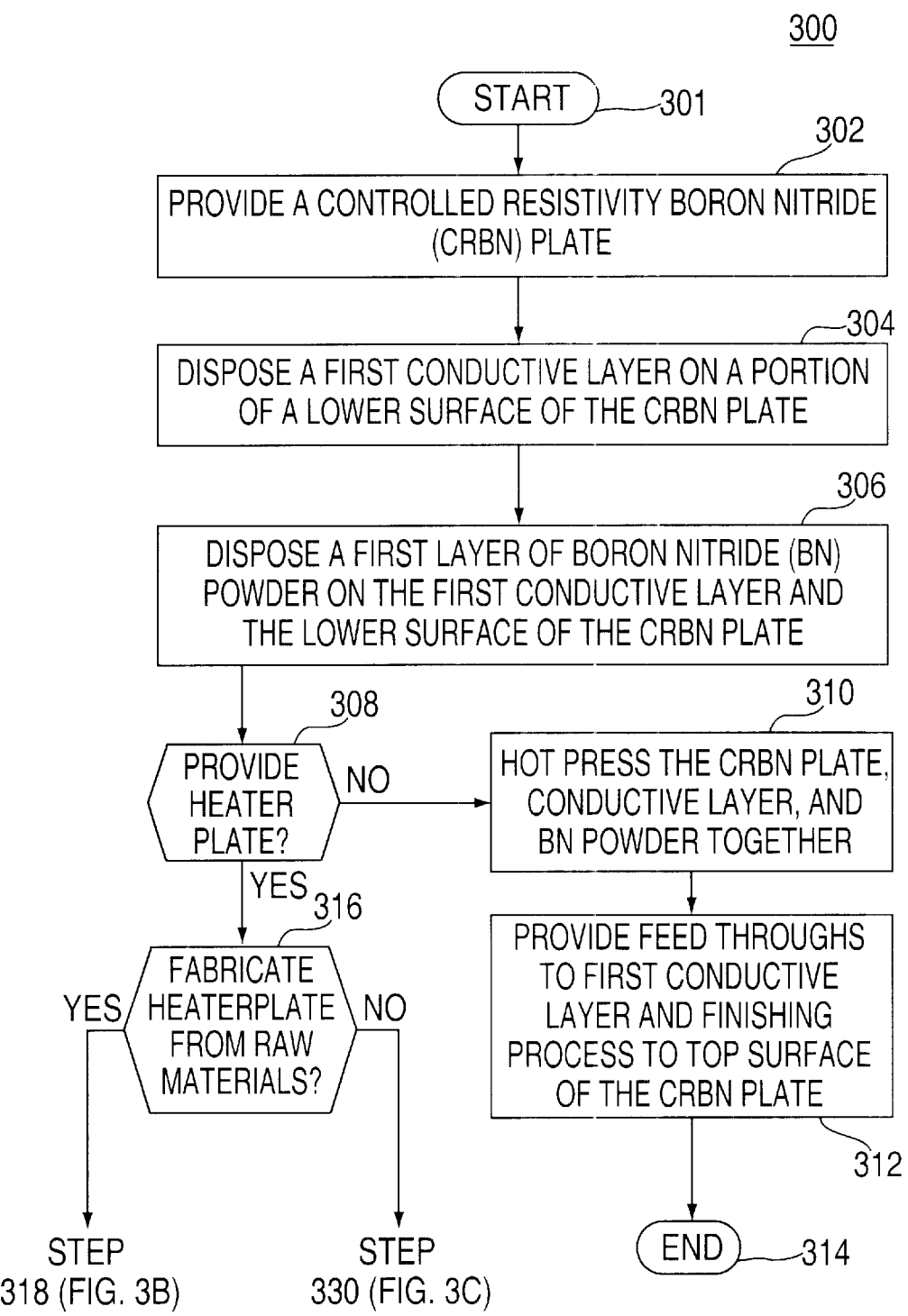
FIGS. 3A through 3C (collectively FIG. 3) depict a flowchart of a first method for fabricating the present invention.
Figure 3B:
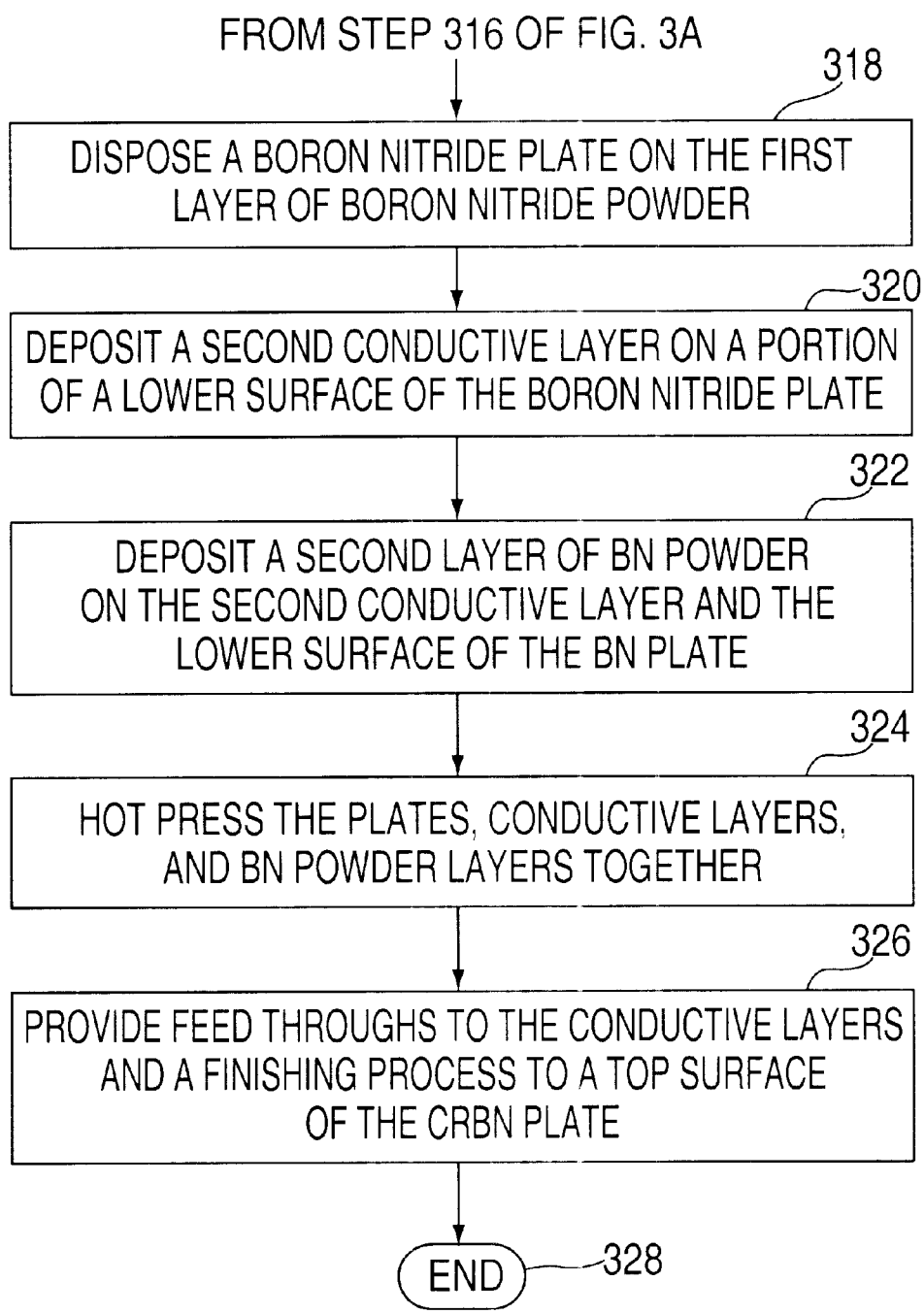
Figure 3C:
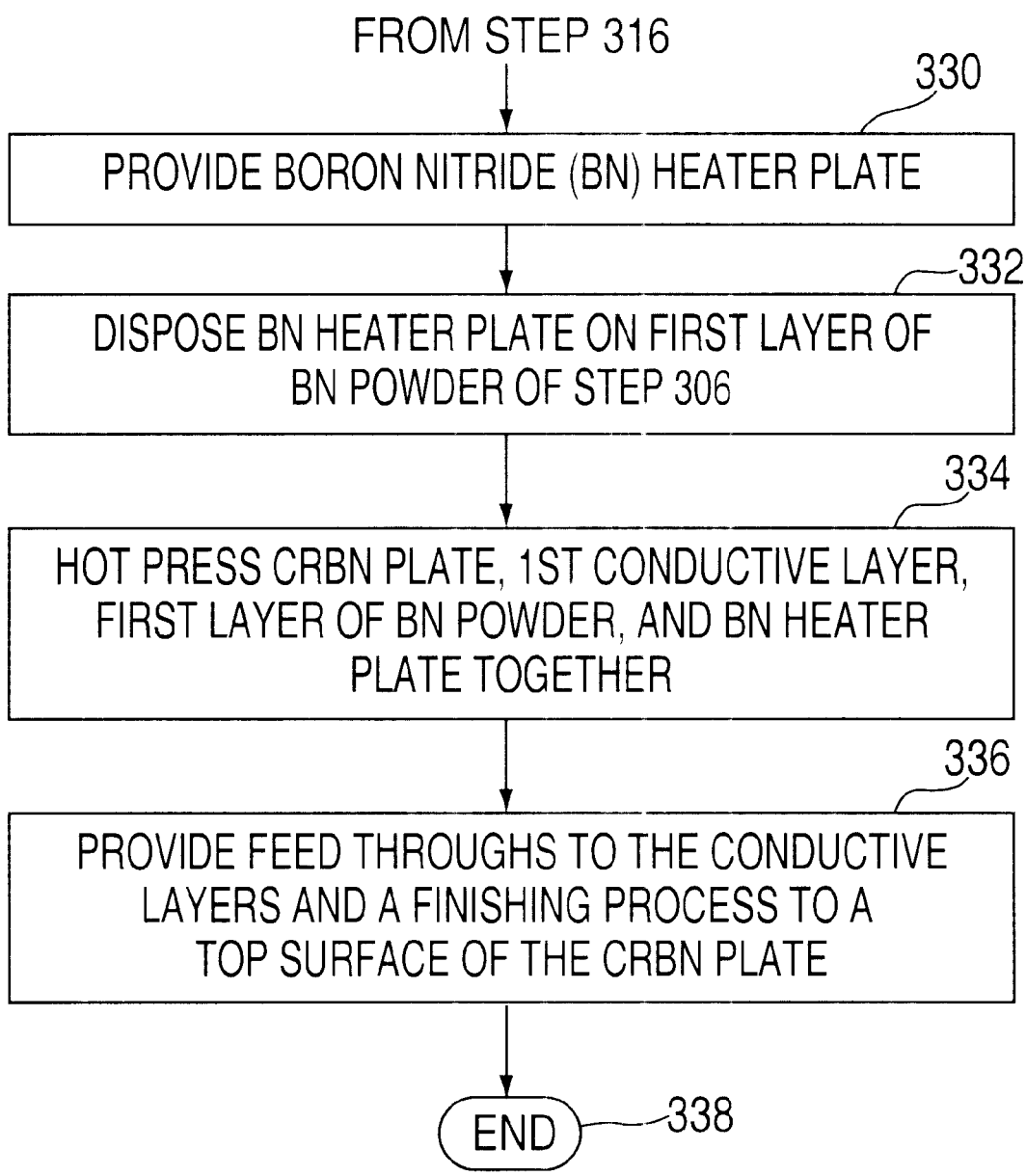

FIGS. 3A through 3C (collectively FIG. 3) depict a flowchart of a first method 300 for fabricating a semiconductor wafer support assembly 202. Specifically, FIG. 3 illustratively depicts a hot pressing or issostatic hot pressing fabrication process 300 for the entire embodiment of the chuck as shown in FIG. 2. Referring to FIG. 3A, the process 300 begins in step 301 and proceeds to step 302, where a controlled resistivity boron nitride plate is provided. The controlled resistivity boron nitride (CRBN) plate is produced by hot issostatically pressing the boron nitride material, such that the heat and pressure exerted on all the sides of the boron nitride plate reduces the resistivity to approximately $10^{11}$ ohm-cm. By hot pressing (i.e., providing uniform pressure about tow opposing surface areas such as the bottom and top surface areas) or hot issostatically pressing the boron nitride (i.e., providing uniform pressure about all of the surface areas, (the top, bottom and sides)), the resistivity of the boron nitride is altered. Specifically, the resistivity of BN powder is lowered from $10^{15}$ ohm-cm to $10^{11}$ ohm-cm, without having to add a dopant material. The controlled resistivity boron nitride plate 203 serves as the electrostatic chuck portion 104 of the support assembly 202.

The method 300 then proceeds to step 304. In step 304 a first conductive (i.e., graphite) layer having a thickness in the range of 50–300 microns is disposed on a surface of a controlled resistivity boron nitride plate 203. The conducting layer covers a portion of the surface area. In particular, a diameter of the conducting layer is less than the diameter of the surface of the CRBN plate, such that an edge portion about the outer radius or periphery of the CRBN plate remains uncovered. The conducting layer serves as a chucking electrode for chucking a wafer to an upper surface of the electrostatic chuck. One skilled in the art will recognize that various configurations may be utilized to form the conductive layer, such as a monopolar conductor (i.e., conductive plate) or a bipolar conductive layer such as depicted in FIG. 2. Alternately, a conductive foil layer such as pyrolytic graphite may be placed upon a surface of the controlled resistivity boron nitride plate. In this instance, the foil layer serves as a monopolar electrode.

In step 306, a boron nitride powder is provided. The boron nitride powder serves as a covering layer over the entire surface of the CRBN plate, including the chucking electrodes. In particular, the boron nitride powder fills in any spaces between the electrodes and levels the surface of the CRBN plate for receiving a boron nitride heater plate, as well as serving as an adhesive material.

In step 308, a determination is made whether the optional heater plate is to be fabricated with the CRBN electrostatic chuck. If, in step 308, the determination is answered negatively, then the method 300 proceeds to step 310. In step 310, the CRBN electrostatic chuck 202 is placed in a furnace for curing. For example, the assembly is hot pressed at a temperature of in a range of 1500 C. to 2200° C., at a pressure in a range of 75 to 100 atmospheres, and for a period of time in the range of 30 minutes to 8 hrs. This curing step 308 is accomplished by hot pressing or hot issostatically pressing the CRBN electrostatic chuck 202, electrode layer, and the boron nitride powder together to form an electrostatic support assembly 104.

In step 312, one or more insulated feedthroughs are formed in the hot pressed electrostatic chuck to provide an insulated path between the conductive electrode and the bottom of the pedestal. Specifically, at least one bore is drilled in the heater plate portion of the electrostatic chuck assembly whereby an insulated feedthrough is inserted therein. The bore is utilized to retain a bolt, which is in contact with the heater electrode and is coupled to a power source for providing current.

Furthermore, in step 312, the upper surface of the controlled resistivity boron nitride electrostatic chuck is subjected to a finishing process (e.g., machined) to achieve a desired thickness such that the conductive electrodes provide maximum chucking force. The thickness between the upper surface of the controlled resistivity boron nitride electrostatic chuck and the graphite electrodes is in the range of 50–250 microns, with the preferred embodiment having a thickness of 100 microns.

Optionally, the electrostatic chuck may be formed to receive and transfer a backside gas to a backside of a wafer. In step 312, a center bore is drilled through the heater plate and electrostatic chuck to form a backside gas conduit such that a center aperture is created on the upper surface of the electrostatic chuck. A plurality of grooves is then formed (e.g., machined or laser cut) in the upper surface of the electrostatic chuck. FIG. 6 depicts a plurality of radial and concentric grooves extending from the center aperture on the upper surface of the electrostatic chuck and is discussed in greater details below. Once the finishing process is complete, in step 314, the method 300 ends.

Referring back to step 308, if the determination is answered affirmatively, that is, a heater plate is to be provided, then the method proceeds to step 316. In step 316, the method 300 determines whether to include a prefabricated heater plate or to fabricate the heater plate from raw materials. If, in step 316, the determination is answered affirmatively, then the method 300 proceeds to step 318 in FIG. 3B. If however, in step 316, the determination is answered negatively, then the method 300 proceeds to step 330 in FIG. 3C.

Referring to FIG. 3B, the determination in step 316 is answered affirmatively, and the heater plate is fabricated from raw materials disposed on the CRBN electrostatic chuck. In particular, in step 318, a boron nitride plate is disposed on the first layer of boron nitride powder from step 306. The boron nitride heater plate is substantially equal in diameter to the controlled resistivity boron nitride plate. In step 320, a second conductive layer (e.g., graphite layer or pyrolytic graphite) is disposed on a portion of a lower surface of the boron nitride plate. Then, in step 322, a second layer of boron nitride powder is disposed on the second conductive layer and the lower surface of the boron nitride heater plate. The method 300 then proceeds to step 324.

In step 324, the stack of plates, conductive layers and BN powder layers are hot pressed together. In particular, the combined layers are hot pressed at a temperature of in a range of 1500 C. to 2200° C., at a pressure in a range of 75 to 100 atmospheres, and for a period of time in the range of 30 minutes to 8 hrs. This curing step 308 is accomplished by hot pressing or hot issostatically pressing the CRBN plate 203, electrode layers, and the boron nitride powder layers together to form an electrostatic support assembly 202 comprising an electrostatic chuck plate 203 and a heater plate 204.

The method 300 then proceeds to step 326, where a finishing procedure similar to step 312 is performed. In particular, a plurality of bores is provided through the heater plate and electrostatic chuck. The plurality of bores provide access for the electrode feedthroughs in the electrostatic chuck and heater elements. In addition, one skilled in the art will recognize that the other finishing processes described in step 312 (e.g., backside gas conduit, polishing, and the like) may also be applied to the combined electrostatic chuck/heater plate assembly fabricated in step 324. Once the finishing process is complete, in step 328, the method 300 ends.

Referring to FIG. 3A, if in step 316, a determination was answered negatively, then the method 300 proceeds to step 330 of FIG. 3C. In step 330, a prefabricated boron nitride heater plate having a conductive heater element is provided and disposed over the boron nitride powder layer. The boron nitride heater plate is substantially equal in diameter to the controlled resistivity boron nitride plate. Specifically, the prefabricated BN heater plate has a conductive heater element already embedded therein. The conductive heater element is fabricated from the same materials as described with regard to the second conductive layer of step 320.

Once the CRBN electrostatic chuck 104 and optional heater plate 204 are fabricated, the electrostatic chuck assembly 202 is mounted to the pedestal 106. In particular, the electrostatic chuck assembly 202 is first orientated such that the boron nitride heater plate 204 faces the pedestal 106, and the controlled resistivity boron nitride chuck 104 is above the heater plate 204.

In a non-detachable embodiment, the electrostatic chuck assembly 202 is mounted over and bolted to the pedestal 104. Alternately, in a detachable embodiment, the electrostatic chuck assembly 202 is mounted over and clamped about the perimeter of the pedestal 106. Thereafter, the feedthroughs are coupled to their respective power sources. In the embodiment where the backside gas is utilized, the backside gas conduit is coupled to a gas source. For a detailed understanding of an RF heater element contact assembly for a detachable electrostatic chuck, the reader should refer to the drawings and the detailed description contained in commonly assigned pending U.S. application Ser. No. 60/210,891, filed Jun. 9, 2000, titled FULL AREA TEMPERATURE CONTROL FOR AN ELECTROSTATIC CHUCK and incorporated herein by reference. That disclosure teaches a detachable electrostatic chuck having a full area temperature control across the entire face or surface of the chuck and used in a physical vapor deposition, chemical vapor deposition, or etching chamber manufactured by Applied Materials, Inc. of Santa Clara, Calif.

Figure 4A:
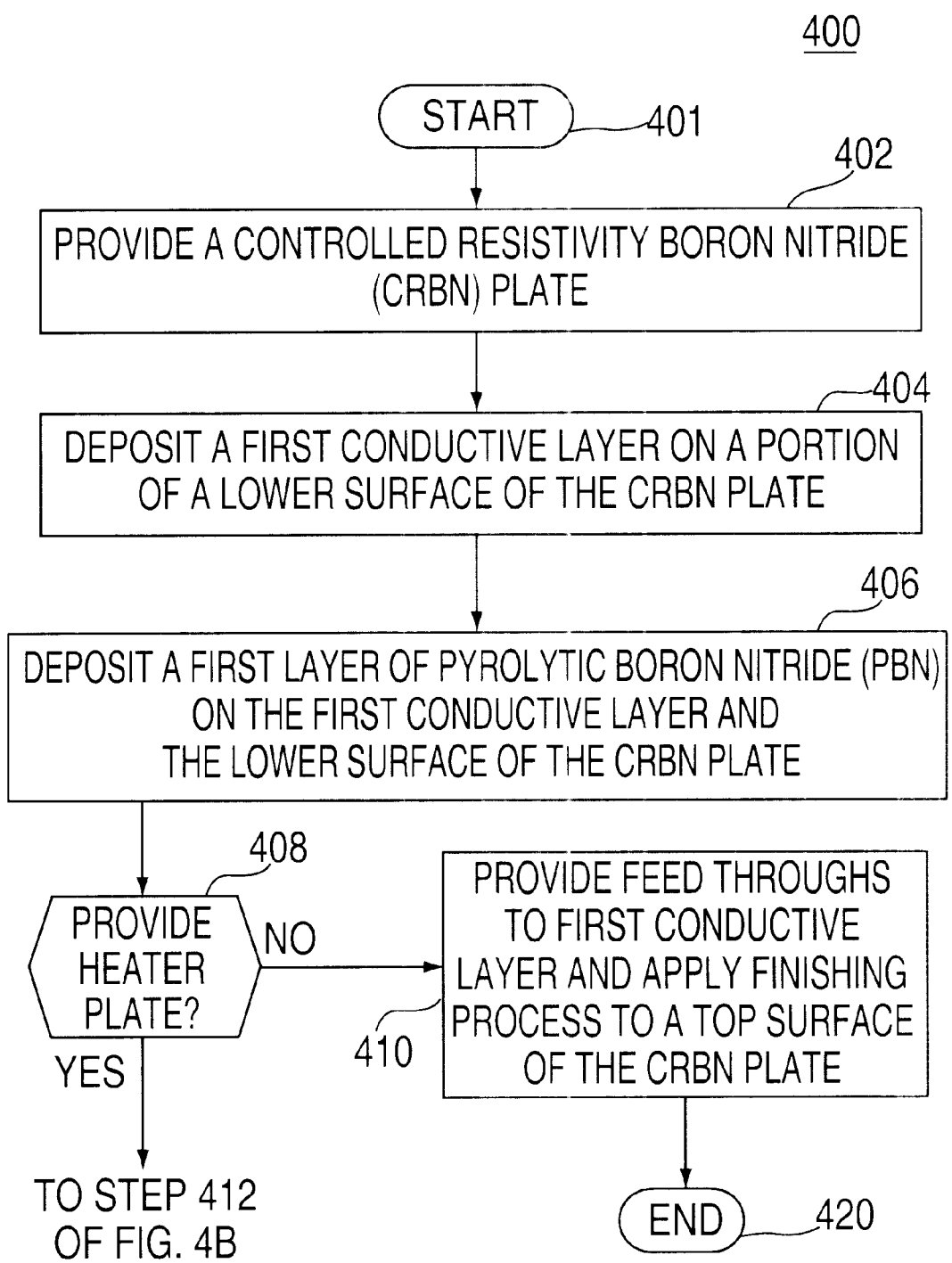
FIGS. 4A and 4B (collectively FIG. 4) depict a flowchart of a second method for fabricating the present invention.
Figure 4B:
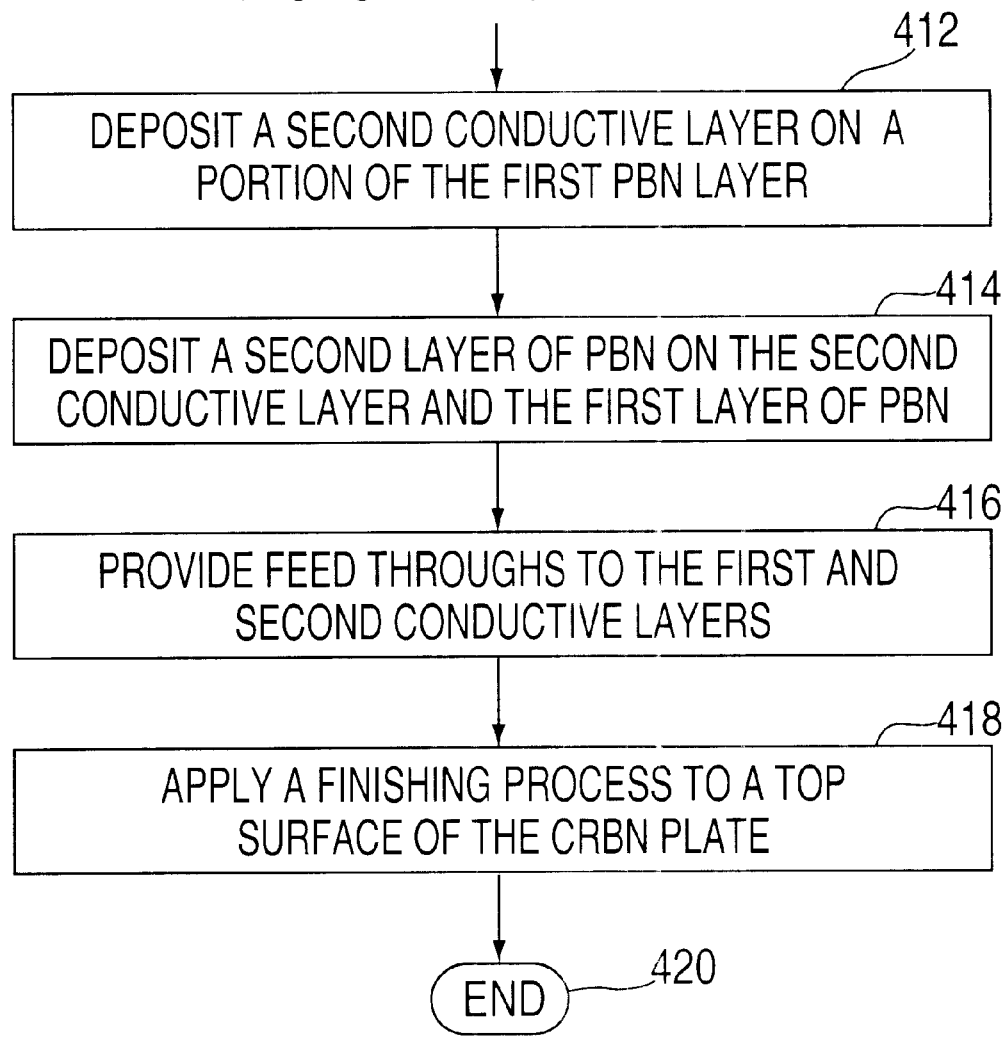

FIGS. 4A and 4B (collectively FIG. 4) depict a flowchart of a second method 400 for fabricating the electrostatic chuck assembly 202. Specifically, FIG. 4 illustratively depicts a CVD fabrication process 400 for the embodiment of the chuck as shown in FIG. 2.

Referring to FIG. 4A, the method 400 begins at step 401 and proceeds to step 402 where a controlled resistivity boron nitride (CRBN) plate having a resistivity value of approximately $10^{15}$ ohm-cm is provided. In particular, the CRBN plate is produced by either hot pressing or issostatically hot pressing the boron nitride, as discussed in method 300 above. In step 404, a first conductive layer (i.e., pyrolytic graphite) is deposited upon a portion of a surface of the CRBN plate as discussed in step 302 of method 300. Specifically, a pattern of pyrolytic graphite is deposited through a deposition process, illustratively, a chemical vapor deposition (CVD), to form a layer that will function as a chucking electrode. The pattern deposited may be either a bipolar electrode or a monopolar electrode.

In step 406 a first pyrolytic boron nitride coating is deposited over the conductive graphite layer and the surface of the (CRBN) plate. Preferably, the CVD process is utilized to form the first boron nitride coating. The method 400 then proceeds to step 408.

In step 408 a query is performed to determine whether an optional heater plate is to be added to the electrostatic chuck. If, in step 408, the query is answered negatively, then the method proceeds to step 410. In step 410 feedthroughs are provided to the first conductive layer and a finishing process is applied to the top surface of the CRBN plate as described in step 312 of FIG. 3. Once the finishing process is complete, in step 420, the method 400 ends.

If, however, in step 408, the query is answered affirmatively, then the method proceeds to step 412 of FIG. 4B. In step 412, a second pyrolytic conductive layer is deposited over the first boron nitride coating. Preferably, the second conductive layer is deposited via a CVD process. The second conductive layer preferably is also pyrolytic graphite, which serves as a heater element. Furthermore, the second conductive layer is arranged in a pattern over the first boron nitride coating such that uniform heating over the full surface area of the chuck will be obtained as discussed with regard to FIG. 2. In step 414, a second pyrolytic boron nitride coating is deposited over the second conductive pyrolytic graphite layer and the surface of the first pyrolytic boron nitride coating of step 406. Preferably the CVD process is utilized to form the second pyrolytic boron nitride coating. The method 400 then proceeds to step 416.

In steps 416 and 418, the method 400 follows the finishing process in step 326 of method 300. In particular, in step 416, the chuck is machined, drilled, and cut to provide heater element and electrode feedthroughs. In step 418, the proper thickness of the surface of the electrostatic chuck with respect to the chucking electrodes is provided. In addition, a backside gas conduit and respective grooves are optionally provided. The finished electrostatic chuck assembly then mounted to the pedestal. Once the finishing process (steps 416 and 418) is complete, the method 400 ends in step 420.

FIGS. 3 and 4 illustratively depict flowcharts of two methods 300 and 400, for which a controlled resistivity boron nitride plate 203 may be used in an electrostatic chuck assembly 202. Although these two preferred embodiments provide a specific procedure for the fabrication of such electrostatic chuck assembly 202, a person skilled in the art will recognize that various steps from either methods 300 or 400 may be interchanged. For example, steps 412 through 418 of method 400 may be performed after completion of steps 302 through 310 of method 300. In other words, the deposition process for the conductive layers of method 400 can be interchanged with disposing of the conductive layers of method 300. Similarly, the steps of adding boron nitride powder layers of method 300, may be interchanged to depositing boron nitride layers as disclosed in method 400.

Furthermore, the electrostatic chuck assembly 202 is depicted as being fabricated from the CRBN plate 203 first and then adding the additional components and heater plate 204. However, one skilled in the are will recognize that the methods 300 and 400 may begin with providing or fabricating the heater plate 204 initially and adding the electrode layers and CRBN plate 203 thereafter. That is, fabricating the electrostatic chuck assembly in essentially a reverse order.

Maintaining a uniform temperature across the entire wafer is desirable during proper wafer processing. The backside of the wafer 102 and the top surface 105 of the electrostatic chuck 104 are relatively smooth. However, imperfections in each of these surfaces create interstitial spaces when these surfaces come into contact. As such, the entire wafer is not in direct thermal contact with the chuck. One method of maintaining proper thermal transfer conditions at the wafer during processing is by pumping an inert thermal transfer gas into interstitial spaces or specially formed grooves in the chuck surface, when the clamping force is applied.

Figure 5:
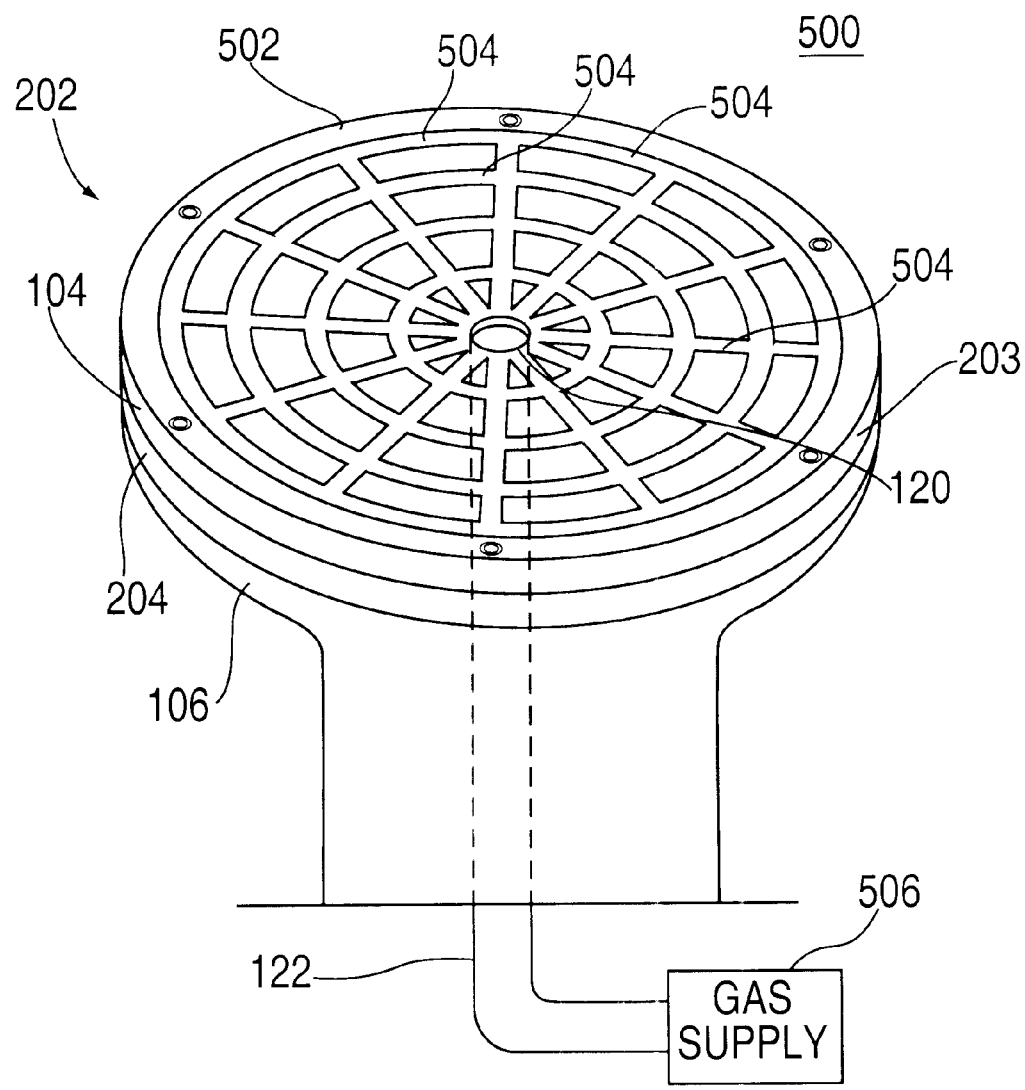
FIG. 5 is a top perspective view of the present invention.

FIG. 5 depicts a perspective view of the wafer support assembly 200 without a wafer retained thereon. Specifically, a wafer support surface 502 is shown in detail. FIG. 5 illustratively depicts one optional embodiment 500 that provides a thermal transfer gas or "backside" gas, which is distributed between the wafer support surface and the backside of the wafer (not shown). In particular, a plurality of grooves 504 is provided in the wafer support surface 502 of the electrostatic chuck 104. The grooves 504 illustratively extend radially outward from a center aperture 120 provided in the chuck 104. That is, the center aperture 120 extends through chuck assembly 202 (i.e., the combined electrostatic chuck/heater plates 203/204) and the pedestal 106 (as shown in phantom) to provide a path for the backside gas to the wafer support surface 502.

The gas grooves 504 are formed into the wafer support surface 502 by any known method for providing surface features in a boron nitride based structure. Such methods include but are not limited to etching, machining, or laser cutting after the hot pressing process steps of methods 300 or 400. The thermal transfer gas is provided by a gas supply 506, via the backside gas conduit 122, which is coupled to the center aperture 120 and gas supply 506. The thermal transfer gas, usually, Helium or Argon, acts as a thermal conduction medium between the wafer 102 and the wafer support surface 502 of the electrostatic chuck 104.

Since the distribution of thermal transfer gas to the interstitial spaces and chuck grooves 504 is osmotic and the interstitial spaces may not all be interconnected, some spaces do not receive any gas. This condition can also lead to a non-uniform temperature profile across the backside of the wafer 102 during processing and result in wafer damage. As such, it is advantageous to have as large a gas aperture 120 and groove width as possible to maximize thermal transfer gas flow and pressure beneath the wafer. However, the limited attractive wafer clamping (Coulombic) force establishes a limit on the size of this aperture and the gas pressure therein.

The above described methods and apparatus provide an electrostatic chuck 104 fabricated from low resistivity boron nitride, which exhibits altered physical properties to establish improved chucking forces that retain a semiconductor wafer. Specifically, boron nitride is hot issostatically pressed to alter the mechanism of attraction from simple Coulombic forces to one utilizing a Johnsen-Rahbek effect. The resultant apparatus is capable of retaining a wafer 102 with a greater attractive force. As such, a greater thermal transfer gas flow and pressure can be attained under the wafer 102 without the wafer popping off of the chuck 104 due to an inadequate chucking force. The increased thermal transfer gas conditions promote greater temperature control of the wafer and more accurate temperature uniformity during wafer processing. Furthermore, the controlled resistivity boron nitride does not exhibit the increased conductivity and corresponding deterioration in the chuck's ability to chuck the wafer, as other ceramic chucks utilizing the Johnson-Rahbek effect have exhibited after repeated wafer processing operations.

Although various embodiments that incorporate the teachings of the present invention have been shown and described in detail herein, those skilled in the art can readily devise many other varied embodiments that still incorporate these teachings.

What is claimed is:

1. An electrostatic chuck apparatus comprising:
    a controlled resistivity boron nitride plate having a resistivity value less than a standard resistivity value of boron nitride; and
    at least one chucking electrode embedded in said controlled resistivity boron nitride plate.

2. The apparatus of claim 1 wherein the electrostatic chuck apparatus is hot pressed.

3. The apparatus of claim 2 wherein electrostatic chuck apparatus is issostatically hot pressed.

4. The apparatus of claim 1 wherein the resistivity value of the controlled resistivity boron nitride plate is approximately $10^{11}$ ohm-cm.

5. The apparatus of claim 1 further comprising a heater plate having at least one heater element, said heater plate disposed below said controlled resistivity boron nitride plate.

6. The apparatus of claim 5 wherein a resistivity value of the controlled resistivity boron nitride plate is less than a resistivity value of the heater plate.

7. The apparatus of claim 6 wherein the heater plate is fabricated from boron nitride.

8. The apparatus of claim 5 wherein the at least one heater element is a material selected from the group comprising molybdenum, tungsten, tantalum, and graphite.

9. The apparatus of claim 1 wherein the at least one heater element is a pyrolytic material.

10. The apparatus of claim 1 wherein the at least one chucking electrode is a material selected from the group comprising molybdenum, tungsten, tantalum, and graphite.

11. The apparatus of claim 10 wherein the at least one chucking electrode is a pyrolytic material.

12. The apparatus of claim 1 wherein the at least one chucking electrode is a bipolar electrode.

13. The apparatus of claim 1 wherein the at least one chucking electrode is a plate.

14. The apparatus of claim 1 wherein said controlled resistivity boron nitride plate comprises a top surface having a plurality of grooves extend radially from a backside gas aperture.

15. The apparatus of claim 1 wherein said controlled resistivity boron nitride plate is mounted to a pedestal support in a semiconductor processing chamber.

16. The apparatus of claim 14 wherein said controlled resistivity boron nitride plate is detachably mounted to the pedestal support.

17. The apparatus of claim 5 wherein said heater plate is mounted to a pedestal support in a semiconductor processing chamber.

18. The apparatus of claim 17 wherein said heater plate is detachably mounted to the pedestal support.

* * * * *